United States Patent
Ryan et al.

(10) Patent No.: US 9,996,861 B2
(45) Date of Patent: Jun. 12, 2018

(54) USER IDENTIFICATION AND PERSONALIZATION BASED ON AUTOMOTIVE IDENTIFIERS

(71) Applicant: PayPal, Inc., San Jose, CA (US)

(72) Inventors: Michael Joseph Ryan, Wellesley, MA (US); Christopher Dennis Boncimino, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days. days.

(21) Appl. No.: 15/066,533

(22) Filed: Mar. 10, 2016

(65) Prior Publication Data

US 2016/0189252 A1 Jun. 30, 2016

Related U.S. Application Data

(63) Continuation of application No. 13/706,678, filed on Dec. 6, 2012, now Pat. No. 9,324,002.

(60) Provisional application No. 61/601,972, filed on Feb. 22, 2012.

(51) Int. Cl.
| | |
|---|---|
| *G06Q 30/02* | (2012.01) |
| *G06K 9/46* | (2006.01) |
| *G06Q 30/06* | (2012.01) |
| *G06F 17/30* | (2006.01) |
| *G06K 9/00* | (2006.01) |

(52) U.S. Cl.
CPC ... *G06Q 30/0281* (2013.01); *G06F 17/30557* (2013.01); *G06K 9/00771* (2013.01); *G06K 9/46* (2013.01); *G06Q 30/06* (2013.01); *G06K 2209/15* (2013.01)

(58) Field of Classification Search
CPC ....... G06K 9/46; G06K 2209/15; G06Q 30/06
See application file for complete search history.

(56) References Cited

U.S. PATENT DOCUMENTS

| | | | |
|---|---|---|---|
| 6,708,176 B2 | 3/2004 | Strunk et al. | |
| 7,769,632 B2 | 8/2010 | Giraud et al. | |
| 8,768,009 B1 | 7/2014 | Smith | |
| 9,324,002 B2 * | 4/2016 | Ryan ..................... | G06K 9/46 |
| 2002/0032613 A1 | 3/2002 | Buettgenbach et al. | |
| 2002/0111881 A1 | 8/2002 | Walker et al. | |

(Continued)

FOREIGN PATENT DOCUMENTS

| | | |
|---|---|---|
| WO | WO2011145054 A1 * | 11/2011 |
| WO | WO-2013126772 A1 | 8/2013 |

OTHER PUBLICATIONS

"U.S. Appl. No. 13/706,678, Final Office Action dated May 29, 2015", 18 pgs.

(Continued)

*Primary Examiner* — Edward Park
(74) *Attorney, Agent, or Firm* — Maschoff Brennan

(57) ABSTRACT

A system and method for user identification and personalization based on automotive identifiers are described. Image data of a vehicle is received from an image capture device. Vehicle identification information is extracted from the image data. A data record associated with a user is retrieved using the vehicle identification information. A personalized communication for the user is generated based on the retrieved data record. The personalized communication may be transmitted to a device. The personalized communication may comprise a recommendation.

16 Claims, 7 Drawing Sheets

(56) References Cited

U.S. PATENT DOCUMENTS

| | | | |
|---|---|---|---|
| 2002/0178073 A1 | 11/2002 | Gravelle | |
| 2003/0042303 A1 | 3/2003 | Tsikos et al. | |
| 2003/0195821 A1 | 10/2003 | Kennamer | |
| 2006/0278705 A1* | 12/2006 | Hedley | G07B 15/063 235/384 |
| 2008/0040278 A1 | 2/2008 | Dewitt | |
| 2008/0167966 A1 | 7/2008 | Ramsdale et al. | |
| 2011/0025842 A1 | 2/2011 | King et al. | |
| 2011/0148753 A1 | 6/2011 | Eckhoff et al. | |
| 2013/0005443 A1* | 1/2013 | Kosta | G07F 17/3206 463/25 |
| 2013/0132102 A1* | 5/2013 | Andrade | G06Q 50/30 705/1.1 |
| 2013/0216102 A1 | 8/2013 | Ryan et al. | |

OTHER PUBLICATIONS

"U.S. Appl. No. 13/706,678, Non Final Office Action dated Dec. 12, 2014", 9 pgs.

"U.S. Appl. No. 13/706,678, Notice of Allowance dated Dec. 18, 2015", 10 pgs.

"U.S. Appl. No. 13/706,678, filed Mar. 20, 2015 to Non Final Office Action dated Dec. 12, 2014", 13 pgs.

"U.S. Appl. No. 13/706,678, filed Nov. 30, 2015 to Final Office Action dated May 29, 2015", 8 pgs.

"Australian Application Serial No. 2013222234, First Examiner Report dated Jun. 4, 2015", 3 pgs.

"Australian Application Serial No. 2013222234, Response filed Feb. 15, 2016 to First Examiner Report dated Jun. 4, 2015", 17 pgs.

"Australian Application Serial No. 2013222234, Subsequent Examiners Report dated Feb. 29, 2016", 3 pgs.

"Canadian Application Serial No. 2,866,482, Office Action dated Oct. 14, 2015", 4 pgs.

"International Application Serial No. PCT/US2013/027426, International Preliminary Report on Patentability dated Sep. 4, 2014", 6 pgs.

"International Application Serial No. PCT/US2013/027426, International Search Report dated May 2, 2013", 2 pgs.

"International Application Serial No. PCT/US2013/027426, Written Opinion dated May 2, 2013", 4 pgs.

* cited by examiner

USER IDENTIFICATION AND PERSONALIZATION BASED ON AUTOMOTIVE IDENTIFIERS

CROSS-REFERENCE TO RELATED APPLICATIONS

This application is a continuation of U.S. patent application Ser. No. 13/706,678, filed on Dec. 6, 2012, which claims priority to U.S. Provisional Application No. 61/601,972, filed on Feb. 22, 2012, which are hereby incorporated by reference in their entirety as if set forth herein.

TECHNICAL FIELD

The present application relates generally to the technical field of information retrieval, and, in various embodiments, to systems and methods of user personalization based on automotive identifiers.

BACKGROUND

Certain segments of the retail industry attempt to provide users with quick and convenient methods to acquire goods and services. One known method is drive-through service, in which retailers, predominantly restaurants, offer users the ability to place and receive orders from automobiles. While drive-through service offers convenience for a user, the user still must peruse a menu, place an order, and pay for the order.

BRIEF DESCRIPTION OF THE DRAWINGS

Some embodiments of the present disclosure are illustrated by way of example and not limitation in the figures of the accompanying drawings, in which like reference numbers indicate similar elements and in which.

DETAILED DESCRIPTION

Figure 1:
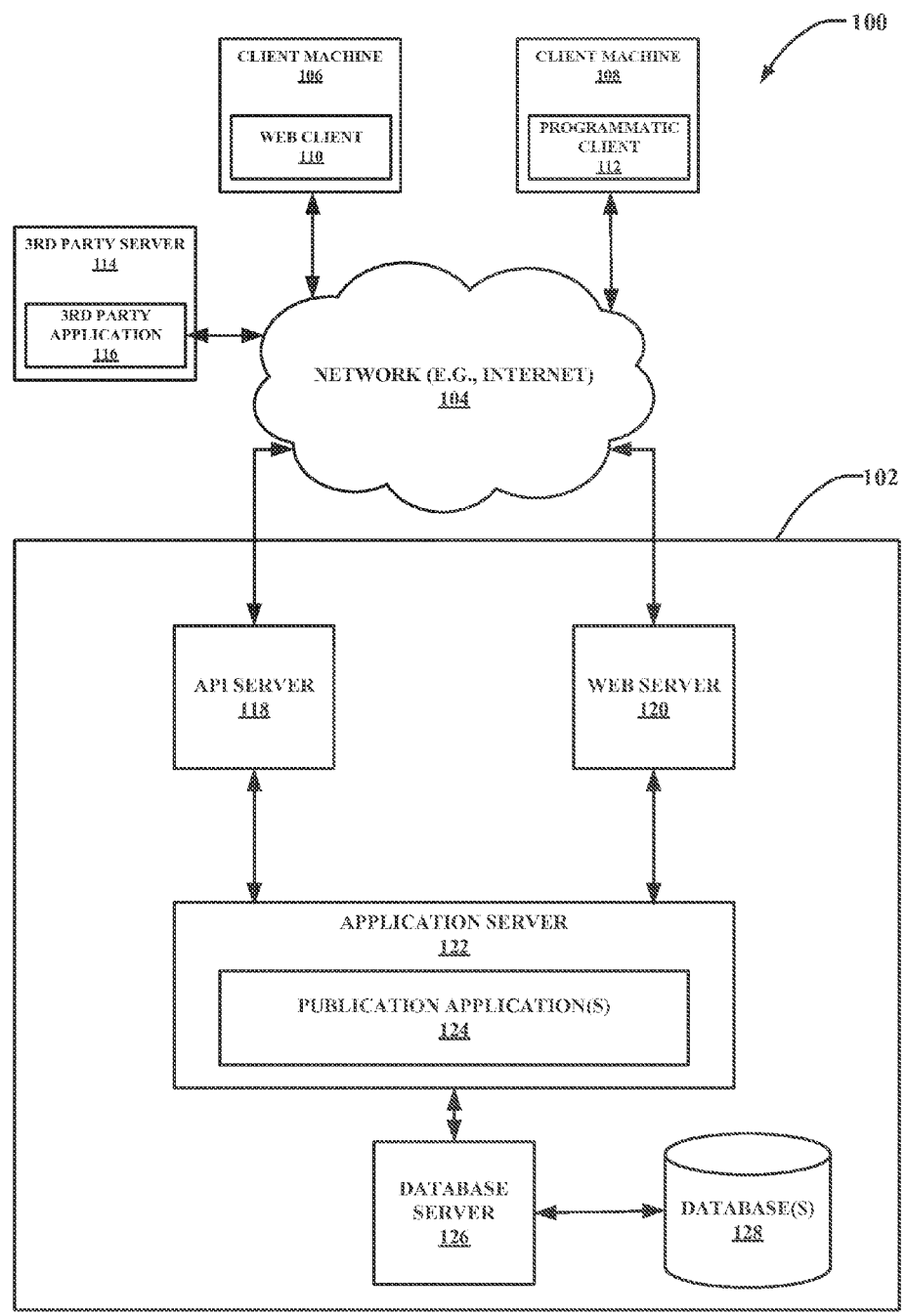
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Methods and systems for user identification and personalization based on automotive identifiers are disclosed. In some embodiments, image data of a vehicle may be received from an image capture device. Vehicle identification information may then be extracted from the image data. A data record associated with a user may be retrieved using the vehicle identification information. A personalized communication may then be generated based on the retrieved data record.

In some embodiments, the image data comprises a still image or video. In some embodiments, the vehicle identification information comprises at least one of a license plate number of the vehicle, a make of the vehicle, a model of the vehicle, and a color of the vehicle. In some embodiments, user identification information is extracted from the image data. The user identification information may be used along with the vehicle identification information in retrieving the data record. In some embodiments, the personalized communication is presented on a display proximate the user. In some embodiments, the image capture device may be located proximate a point-of-sale device that is configured to complete a transaction for an item. In some embodiments, the data record comprises a history of transactions for the user or preferences of the user. In some embodiments, the personalized communication is a recommendation related to at least one item for sale.

In some embodiments, a system comprises at least one processor, an imaging module, a database interface module, and a personalized communication module. The imaging module may be executable by the at least one processor and configured to receive image data of a vehicle from an image capture device and to extract vehicle identification information from the image data. The database interface module may be executable by the at least one processor and configured to use the vehicle identification information to retrieve a data record associated with a user. The personalized communication module may be executable by the at least one processor and configured to generate a personalized communication for the user based on the retrieved data record.

In some embodiments, the image data comprises a still image or video. In some embodiments, the vehicle identification information comprises at least one of a license plate number of the vehicle, a make of the vehicle, a model of the vehicle, and a color of the vehicle. In some embodiments, the imaging module is further configured to extract user identification information from the image data, and the database interface module is further configured to use the user identification information along with the vehicle identification information to retrieve the data record. In some embodiments, the personalized communication module is further configured to cause the personalized communication to be presented on a display proximate the user. In some embodiments, the image capture device is located proximate a point-of-sale device configured to complete a transaction for an item. In some embodiments, the data record comprises a history of transactions for the user or preferences of the user. In some embodiments, the personalized communication is a recommendation related to at least one item for sale.

FIG. 1 shows a network diagram depicting a network system 100, according to various embodiments, having a client-server architecture configured for exchanging data over a network. For example, the network system 100 may comprise a network-based publication system (or interchangeably "network-based publisher") 102 where clients may communicate and exchange data within the network system 100. The data may pertain to various functions (e.g., selling and purchasing of items) and aspects (e.g., data describing items listed on the publication/publisher system) associated with the network system 100 and its users. In some embodiments, the data may correspond to multimedia content, audio content, or visual content. Although illustrated herein as a client-server architecture as an example, other example embodiments may include other network architectures, such as a peer-to-peer or distributed network environment.

A data exchange platform, in an example form of the network-based publisher 102, may provide server-side functionality, via a network 104 (e.g., the Internet) to one or more clients. The one or more clients may include users that utilize the network system 100 and more specifically, the network-based publisher 102, to exchange data over the network 104. These transactions may include transmitting, receiving (communicating) and processing data to, from, and regarding content and users of the network system 100. The data may include, but are not limited to, content and user data such as feedback data; user reputation values; user profiles; user attributes; product and service reviews; product, service, manufacture, and vendor recommendations and identifiers; product and service listings associated with buyers and sellers; auction bids; transaction data; and payment data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments that the client machine 106, 108, or third party server 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

In various embodiments, the client machine may be connected to the network 104 through which the client machine requests and accesses content from one or more content providers. The content may be broadcasted, multicasted, streamed, or otherwise transmitted to the client device by the content providers. In some embodiments, the client machine may store content previously retrieved from a content provider and may access the stored content. In addition to the above-disclosed embodiments, in various embodiments, the client machine may be associated with a user or content viewer.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, feedback, and content items among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., programmatic client 112 or third party application 116) running on another client machine (e.g., client machine 108 or third party server 114).

The publication application(s) 124 may provide a number of publisher functions and services (e.g., search, listing, content viewing, payment, etc.) to users that access the network-based publisher 102. For example, the publication application(s) 124 may provide a number of services and functions to users for listing goods and/or services for sale, searching for goods and services, facilitating transactions, and reviewing and providing feedback about transactions and associated users. Additionally, the publication application(s) 124 may track and store data and metadata relating to listings, transactions, and user interactions with the network-based publisher 102. In some embodiments, the publication application(s) 124 may publish or otherwise provide access to content items stored in application servers 122 or database(s) 128 accessible to the application servers 122 and/or the database server(s) 126.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

While the example network system 100 of FIG. 1 employs a client-server architecture, the present disclosure is not limited to such an architecture. The example network system 100 can equally well find application in, for example, a distributed or peer-to-peer architecture system.

Figure 2:
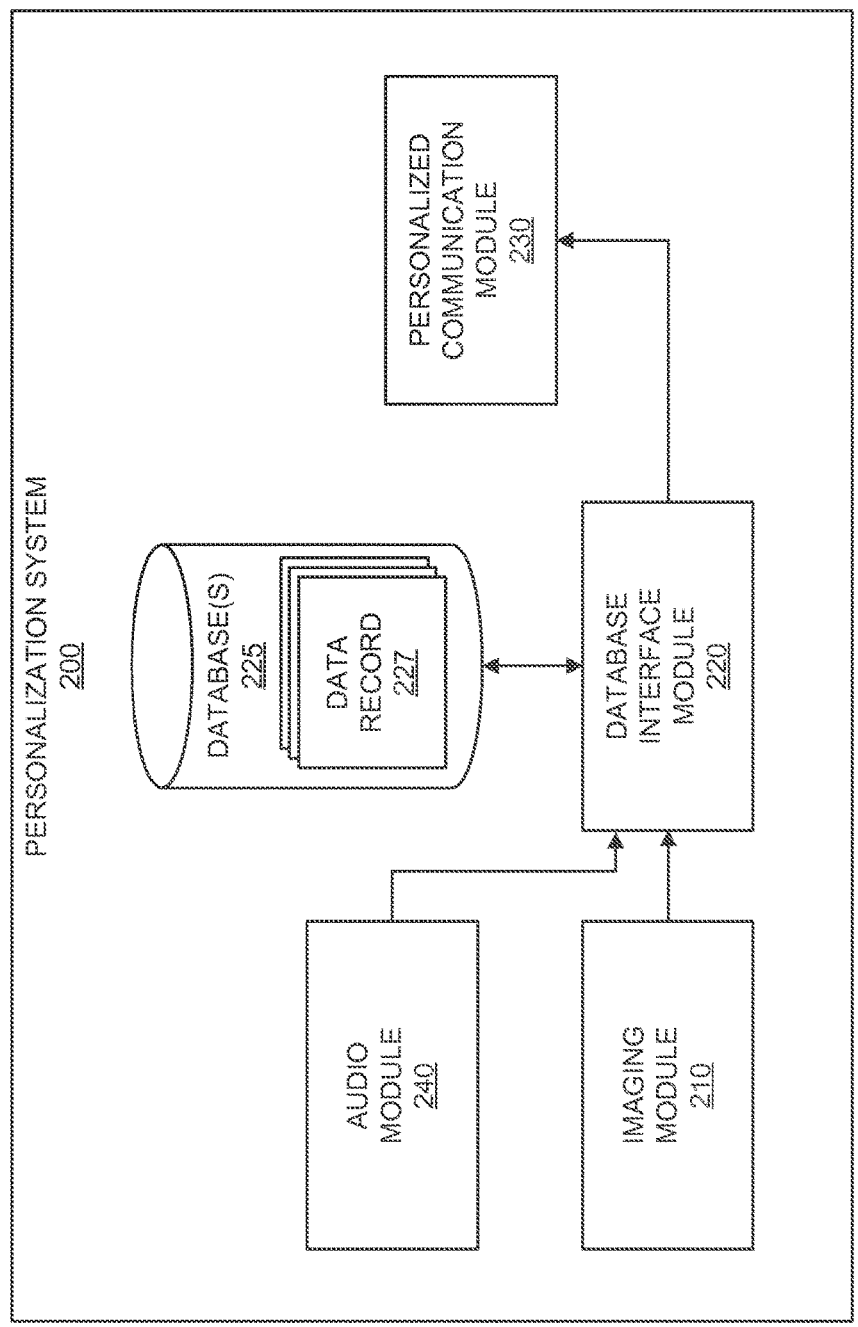
FIG. 2 is a block diagram illustrating an example embodiment of a personalization system.

FIG. 2 is a block diagram illustrating an example embodiment of a personalization system 200. The personalization system 200 may comprise an imaging module 210, a database interface module 220, and a personalized communication module 230.

The imaging module 210 may be configured to receive image data of a vehicle from an image capture device and to extract identification information corresponding to the vehicle from the image data. The image data may comprise still image data and/or video image data. In some embodiments, the identification information may comprise vehicle identification information. In some embodiments, the imaging module 210 may receive image data from one or more image capture devices. Examples of image capture devices include, but are not limited to, video cameras and still picture cameras.

Image data may be processed by the imaging module 210 to recognize information contained in the image data that may identify a user. To the extent needed, the imaging module 210 may perform image recognition on the image data to identify information captured in the data. Image recognition techniques that may be used include, but are not limited to, optical character recognition (OCR), face detection techniques, edge detection, color and pattern matching, and so forth.

In some embodiments, identification information may comprise vehicle identification information. Examples of vehicle identification information include, but are not limited to, a license plate number, a geographic location or license plate issuing authority/entity (e.g., a state or country government) to which a license plate belongs or is associated with, a make and/or model of a vehicle, and a color of a vehicle. Other examples of vehicle identification information include, but are not limited to, one or more other distinguishing features of a vehicle, such as dents, scratches, bumper stickers, emblems, decals, and various vehicle features (e.g., sunroof, spoiler, rims or hubcaps, and exhaust pipes).

In some embodiments, identification information may further comprise user identification information. Examples of user identification information may include, but are not limited to, an image of a user (e.g., a user's face), clothing worn by a user, and one or more identifying features of a user (e.g., tattoos, scars, piercings, hair style, facial hair, glasses, and accessories). In some embodiments, the image data may be captured at specific locations relative to a retailer location (e.g., a retail store). For example, cameras may be placed at certain areas of a drive-through lane, at entrances to a parking lot, at entrances to a physical store, and so forth.

The personalization system 200 may be used in a variety of different environment scenarios. Environments in which the personalization system 200 may be implemented include, but are not limited to, restaurants, fast food locations, quick serve locations, retail stores, parking locations, fuel stations, car washes, hotels and other lodging environments, and other commerce environments as well.

The database interface module 220 may be configured to use the identification information to retrieve a data record 227. In some embodiments, the data record 227 may be associated with a user. In some embodiments, the database interface module 220 may receive one or more pieces of identification information from the imaging module 210 and may use the piece(s) of information as key(s) or search query terms to perform a search of one or more databases 225, which may store data records 227 for users and/or vehicles. For example, a license plate number may be used to look up one or more data records 227. The data records 227 may identify a user associated with the vehicle. The data records 227 also may comprise user history information. One example of user history information is an order history for the user with respect to a specific retailer or online marketplace. The data records 227 may also comprise user preference information. User preference information may be submitted by a user or may be inferred or determined from accumulated user data.

In some embodiments, history and preference data may be stored in a data record 227 associated with a specific vehicle as opposed to with a specific user. In some embodiments, additional identification information may be submitted to further refine the search. For example, a vehicle may be shared by multiple users. By including user information extracted from the image data, data records for a specific user and a specific vehicle may be retrieved.

In some embodiments, the database interface module 220 may retrieve a data record 227 identifying a vehicle and/or a user associated with the vehicle. The database interface module 220 may use this record 227 to identify linked data records which may be separately maintained in the same or different databases. The linked data records may store the user history and/or user preference information. In some embodiments, portions of the vehicle and/or user information may be stored in third party databases. For example, in some embodiments, license plate information may be stored in a third party database maintained by a state's Department of Motor Vehicles.

The personalized communication module 230 may be configured to generate a personalized communication based on the retrieved data record 227. The personalized communication module 230 may receive one or more data records 227 from the database interface module 220 and may generate one or more personalized communications for presentation to a user. In some embodiments, the personalized communications comprise recommendations. The recommendations may be based on the history of a user, the preferences of a user, or both. In some embodiments, the recommendations may comprise offers. In some embodiments, the personalized communication module 230 may generate or retrieve one or more offers based on the user history and/or user preferences for presentation to the user. Offers may include coupons, discounts, and so forth. In some embodiments, the personalized communications may comprise advertisements. These advertisements may be generated or retrieved based on the user history and/or user preferences. In some embodiments, recommendations, offers, and advertisements may be generated based on observed trends from user history data. For example, if a user is ordering food from a drive-through lane, an interactive menu may present one or more healthy menu options based on an observed trend that the user has recently been ordering low-fat menu items. In some embodiments, the recommendations, offers, and advertisements may be transmitted to a client device, such as a display that includes static areas and dynamic areas. For example, the display may include a static area that features fixed or manually changeable menu items and a dynamic area that comprises an electronic display screen capable of presenting dynamic information. In some embodiments, the personalized communication module 230 may present additional information for one or more items, such as further menu or product information. In some embodiments, an advertisement may be transmitted to a display screen to show optimal advertisements at a given time based on image recognition. For example, an advertisement may be transmitted in the form of a personalized communication to a dynamic billboard on a highway or in a parking lot in response to an identification of a particular user or a particular vehicle.

In some embodiments, one or more of the modules described with reference to FIG. 2 may be implemented or executed by one or more processors. Additionally, in some embodiments, one or more of the modules described with reference to FIG. 2 may comprise one or more modules to carry out specific operations or tasks. In some embodiments, some or all of the modules described with reference to FIG. 2 may reside in an application executing on a client device. In some embodiments, some or all of the modules of FIG. 2 may reside on one or more servers of the publication system 102 of FIG. 1. In addition, the modules of FIG. 2 may have separate utility and application outside of the publication system 102 of FIG. 1. The publication system 102 may be hosted on dedicated or shared server machines (not shown) that are communicatively coupled to enable communications between the server machines. The multiple components themselves may be communicatively coupled (e.g., via appropriate interfaces), either directly or indirectly, to each other and to various data sources, to allow information to be passed between the components or to allow the components to share and access common data. Furthermore, the components may access the one or more database(s) 128 via the one or more database servers 126, both shown in FIG. 1.

In some embodiments, client machines or devices (e.g., client machines 106, 108 of FIG. 1) may be employed to use the personalization system 200 of the present disclosure. Client machines may comprise interactive displays that present data (e.g., data published by the network-based publication system 102 of FIG. 1) for viewing and selection by a user. The user may interact with the displays using audio inputs, touch inputs, other biometric inputs (e.g., vision or eye detection, gestures), I/O device inputs, or any other means of interaction.

One or more client machines or devices may communicate and exchange data with one or more application servers (e.g., application server 122 of FIG. 1). In some embodiments, one or more of the client machines may be point-of-sale (POS) devices that are capable of completing transactions involving items desired to be purchased by one or more users. The client machines also may include one or more displays that users may interact with. The displays may present item options to users and may include one or more interfaces that enable users to communicate with a publisher system (e.g., publication system 102 of FIG. 1). For example, users may communicate through microphones, video cameras, keyboards, touch screens, or other user input devices that are part of the displays.

The client devices also may include one or more data capture devices that may capture data from one or more users interfacing with other client devices. For example, a camera may capture and/or record video and/or still images, from which information related to a user or an item associated with a user may be ascertained.

Figure 3:
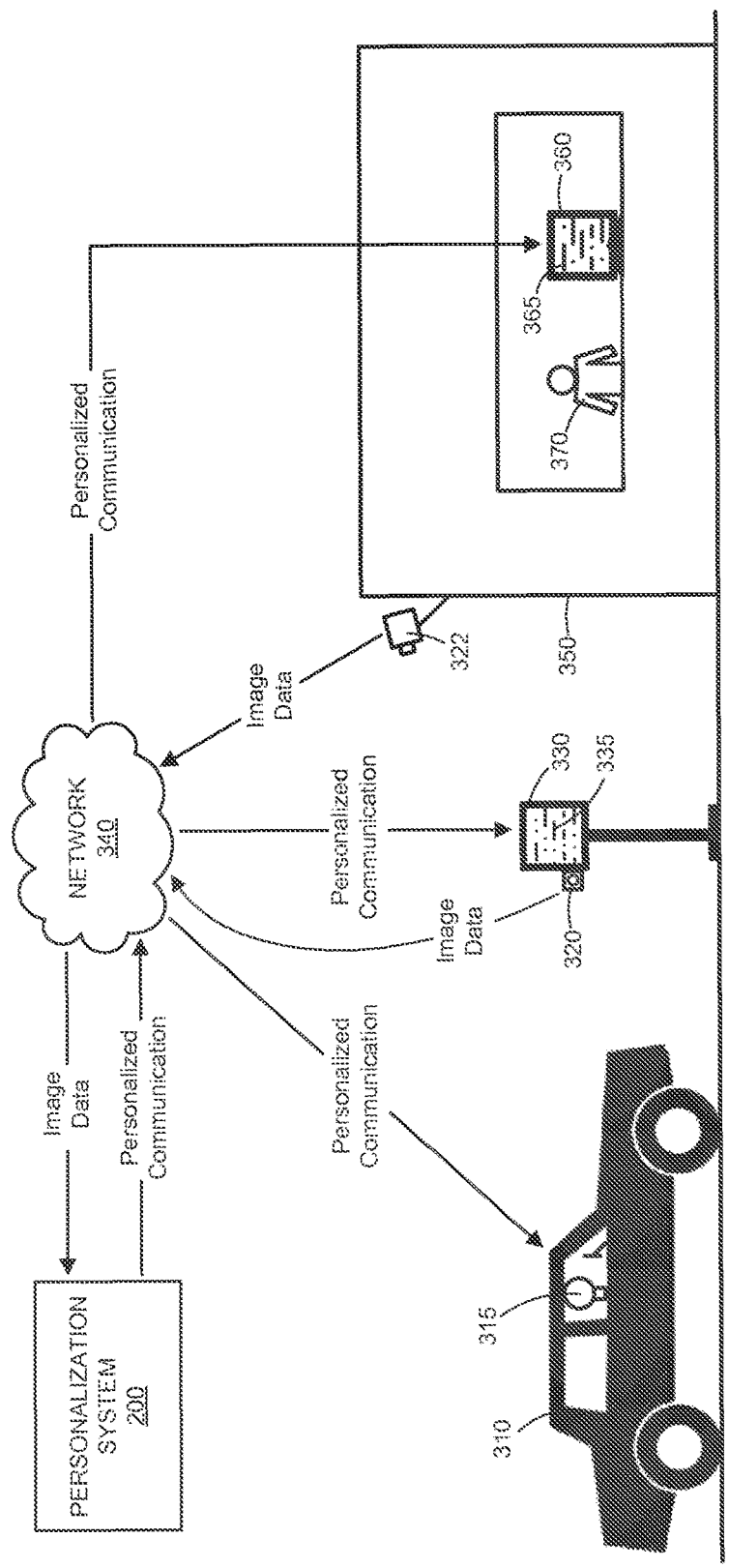
FIG. 3 illustrates an example embodiment of an implementation of a personalization system.

FIG. 3 illustrates an example embodiment of an implementation of a personalization system 200. In some embodiments, a user 315 may drive his or her vehicle 310 through a drive-through lane of a retail store 350. The drive-through lane may comprise an interactive display 330, which may present information 335 (e.g., menu options) to the user 315. In some embodiments, the display 330 may comprise an image capture device 320. The image capture device 320 may capture image data related to the motor vehicle 310 being driven by the user 315. As previously mentioned, this image data may include, but is not limited to, the license plate, make and/or model of the vehicle 310, and any other identifying features of the vehicle 310, such as stickers (located on the bumper or otherwise), any dents or scratches, emblems, decals, type of hubcaps or rims, type of tires, paint color, the presence of a sunroof, the presence of a spoiler, and so forth.

In addition, the image capture device 320 may capture information about the user 315. As previously discussed, this information about the user 315 may include, but is not limited to, an image of the user 315, clothing worn by the user 315, any identifying features (e.g., tattoos, scars, moles, hair style, facial hair, glasses, jewelry and other accessories) of the user 315 visible to the image capture device 320, and so forth. In addition, the image capture device 320 may capture a number of people located in the vehicle 310 along with any identifying information associated with each person.

In some embodiments, an image capture device 322, having the same functional capability as image capture device 320, may be positioned in a location other than alongside or integrated with the display 330. For example, image capture device 322 may be coupled to the retail store 350, such as above the entrance of the retail store 350.

The image data captured by one or more of the image capture devices 320, 322 may be transmitted to the personalization system 200 (e.g., via a network 340) and may be stored in one or more database(s). One or more pieces of the image data may be used by the personalization system 200 to retrieve any data records 227 associated with the user 315. In some embodiments, as previously discussed, the data records 227 may comprise user preference and/or user history data. In some embodiments, the user preference and/or user history data may be specific to an entity, such as a retailer. In some embodiments, the data records 227 may be linked or associated with other records that store the user preference and/or user history data.

In some example embodiments, a license plate of the vehicle 310 being driven by the user may be captured by one of the image capture devices 320, 322 and submitted to the personalization system 200. In some embodiments, the personalization system 200 may perform image recognition on the license plate to recognize the letters, numbers, and/or symbols of the license plate (generally referred to herein as "license plate number"). In some embodiments, the license plate number may be a unique identifier associated with a user 315. The license plate number may be used to retrieve a user data record 227 and any user history or preference information stored therewith.

Based on the retrieved user data record 227, the personalization system 200 may generate a personalized communication and send this personalized communication to one or more devices. In some embodiments, the personalized communication is sent to the display 330 located outside of the retail store 350. In some embodiments, this personalized communication may comprise one or more recommendations. For example, based on a user's data record 227, which may include the user's order history, the interactive display 330 may offer recommendations to the user while the user peruses the display 330. The recommendations may include the user's favorite menu options, the user's last order, one or more items that the user may like based on the user's order history, one or more items fitting within a nutritional profile of the user, and so forth. In addition, one or more offers may be presented to the user on the display 330 to reward the user for the user's business or to incentivize the user to try a new item. When the user orders one or more items, the order may be recorded and the user's data record 227 may be updated.

In some embodiments, an order history and other data related to prior transactions and interactions may be stored for the vehicle 310 rather than for a user 315. That is, one or more data records 227 associated with the license plate (or other identifier) may store history and/or preference information for the vehicle 310. Thus, when the vehicle 310 next enters a drive-through lane and has its license plate number captured, the personalization system 200 may retrieve a data record 227 associated with the vehicle 310. Recommendations and other personalized information may then be presented to an occupant of the vehicle 310.

Although the foregoing examples have been discussed with reference to the use of a license plate number as an identifier for providing personalized user services, it will be appreciated that other data items (e.g., license plate number, make, model, stickers, decals, user image, user clothing, etc.) that may be captured by image capture device 320, 322 may be used to identify and retrieve user-related information. Additionally, combinations of data items may be used to identify a vehicle 310 and/or a user 315 associated with the vehicle 310 and enable retrieval of user-related information.

In some embodiments, a personalized communication generated by the personalization system 200 may alternatively or additionally be sent to a user's personal handheld device (e.g., the user's cell phone) or to a display device of the user's vehicle 310.

In some embodiments, the personalized communication may be sent to a display 360 inside the retail store 350. Although the previous discussion with respect to FIG. 3 has been directed towards an embodiment of the personalization system 200 being implemented in the context of a retail store 350 having a drive-through lane, it is contemplated that the personalization system 200 may also be implemented in the context of a retail store 350 that does not employ a drive-through lane. It is contemplated that the retail store 350 may also be a restaurant or any other place of commerce. In some embodiments, the personalized communication may be used to arrange for personalized service for the user 315 when the user 315 enters the retail store 350. In some embodiments, display 360 inside the retail store 350 may display information 365 based on the personalized communication. This information 365 may then be viewed and used by an employee 370 of the retail store 350. In some embodiments, the personalized communication may comprise instructions, recommendations, or otherwise actionable information and may be communicated only to devices used by employees of the retail store 350 and not to the user 315. In some embodiments, the personalized communication is sent to a device used by an employee of the retail store 350 before being sent to the user 315.

In some embodiments, a concierge service, a favorite salesperson, or other personalized service offerings may greet the user 315 as the user 315 enters the store 350. Depending on the context, if the user 315 has pre-ordered items or arranged for a retail store 350 to hold items for pick up, the store 350 may be provided advanced notice of the user's visit in the form of the personalized communication and may arrange for the items to be available for the user 315 for pick up, such as when the user 315 enters the store 350.

In some embodiments, a user 315 may interface with an application associated with a retailer and may build, compile, assemble, or otherwise select one or more items that the user 315 is interested in purchasing via the application. When a user 315 nears a retail store 350 and is detected by one or more image capture devices 320, 322, the application may be triggered by the personalization system 200 to submit the user's list of items to the retail store 350. In some embodiments, the application may be part of the personalization system 200, or the personalization system 200 may be part of the application. The application may reside on the retailer's on-site computer system or on an off-site computer system. In some embodiments, the application may reside on a user's personal device, such as a cell phone. In some embodiments, the application may be triggered based on a detection of a location of a user device executing the application within a predetermined proximity to the store. For example, the user 315 may be executing the application using his or her cell phone, the detection of which within a predetermined proximity to the retail store 350 may trigger a submission. The application may operate in conjunction with the personalization system 200 to use geo-location or geo-fencing to determine when a retailer is supposed to begin fulfilling the user's order. In some embodiments, the application may be triggered and the retailer may be notified of the user's presence through a check-in performed by the user 315 within the application. The check-in may notify the retailer that the user is within physical proximity of the physical retail store 350 and that the retailer should begin preparing the user's order.

In some embodiments, one or more image capture device(s) 320, 322 may transmit a signal to the application based on a detection of the user 315 and a retrieval of a record of the user 315. The signal may instruct the application to transmit the contents of the order to the retail store 350. The retail store 350 may then prepare the items for pickup by the user 315. In some embodiments, the order may comprise a list of food and beverage items selected from a menu. In this case, the retail store 350 (e.g., restaurant) may begin preparing the food and beverage items so that the user 315 may receive them promptly. In some embodiments, the order may comprise one or more items that the retail store 350 may gather from store inventory.

In some embodiments, with or separate from the order, the application may transmit payment information to the retail store 350 to further streamline the transaction. The payment information may be processed by the retail store 350 to complete the transaction. When the user 315 arrives at the retail store 350, the user 315 may then pick up the ordered items without having to stop to select or pay for the items. In some embodiments, a physical store 350 with a drive-through lane may have multiple drive-through lanes. In one or more of the drive-through lanes, an unattended holding area for an item (e.g., a container, locker, dumbwaiter or receptacle) may replace or supplement a drive-through window. A user 315 with a mobile device may scan his or her mobile device at an interface near the unattended holding area to open a door of the holding area in order to retrieve their order. In some embodiments, the user is allowed access to the inside of the holding area based on the identification of the user 315 or the vehicle 310 by the personalization system 200 without the need for a scan of a mobile device. The identification itself may enable access to the contents within the holding area.

In some embodiments, instead of the application transmitting payment information, the application may call or cause to be executed a second application to handle payment of the order. The second application may be a mobile payment solution, such as a virtual wallet or other payment mechanism. The second application may securely transmit (e.g., via encrypted methods, one-time payment methods, and so forth) payment information for the user 315 to the retail store 350 and may complete a transaction with the retail store 350. Confirmation of payment may be received by the second application and notification of the confirmation may be provided to the first application. In some embodiments, a POS device associated with the physical retail store 350 may transmit received payment information securely to one or more verification services (e.g., via Wi-Fi using a Wi-Fi adapter connected to a USB port on the POS device). The verification services may verify the account information contained in the payment information and confirm the transaction. For example, the verification service may be a credit card company or issuer. If a user 315 uses a Visa credit card to pay for the transaction, the POS device may securely communicate with a server associated with Visa or the card issuer to confirm the account information and receive a confirmation number. In other embodiments, the verification service may be an entity responsible for maintaining the virtual wallet or other payment mechanism used to pay for the order. In some embodiments, the personalization system 200 may authorize a payment with a merchant based on the identification of the user 315 or the vehicle 310. Examples of authorizing a payment may include, but are not limited to, opening a tab, such as using a check-in application that enables a user to check in to a store and then pay for goods and services with an online money transfer account (e.g., a PayPal account).

Although FIG. 3 shows the personalization system 200 and its modules as separate from the image capture devices 320, 322 and the displays 330, 360, it is contemplated that, in some embodiments, the personalization system 200 or any of its modules may be incorporated into the image capture devices 320, 322 or the displays 330, 360 or any other devices. For example, in some embodiments, any or all modules of the personalization system 200 may be incorporated into a retailer's on-site computer system or display system.

Figure 4:
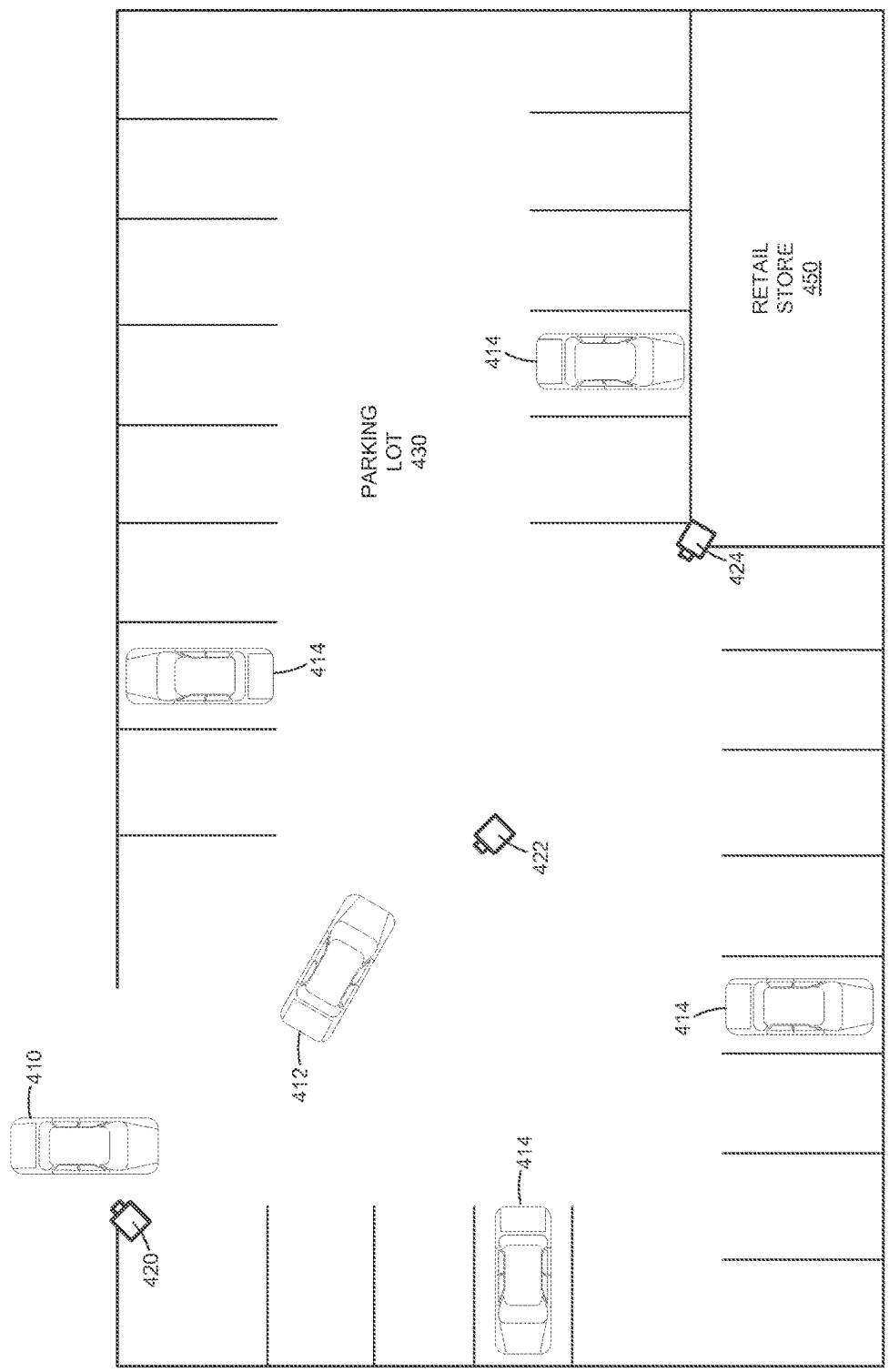
FIG. 4 illustrates another example embodiment of an implementation of a personalization system.

As previously discussed, although the foregoing examples have been discussed with respect to a drive-through lane of a restaurant, embodiments of the disclosure are not so limited. FIG. 4 illustrates another example embodiment of an implementation of a personalization system in a context of a retail store 450 without a drive-through lane. In some embodiments, one or more image capture devices 420, 422, 424 may be strategically placed in areas near the retail store 450. It is contemplated that image capture devices 420, 422, 424 may have the same functional capabilities as those discussed above for image capture devices 320, 322 of FIG. 3. In some embodiments, one or more image capture devices 420 may be located at the entrance to a parking lot 430 of a retail store 450. In some embodiments, one or more image capture devices 422 may be located within the parking lot 430, between the entrance to the parking lot 430 and the entrance to the retail store 450. In some embodiments, one or more image capture devices 424 may be coupled to the retail store 450, for example, next to the entrance of the retail store 450.

The image capture device(s) 420, 422, 424 may capture image data related to a user and/or a vehicle being driven by the user. The image capture device(s) 420, 422, 424 may capture image data of a vehicle 410 entering the parking lot 430, image data of a vehicle 412 driving through the parking lot 430, or image data of a vehicle 414 parked in the parking lot 430. The image data may be transmitted to the personalization system 200 (not shown in FIG. 4). As previously described above, the personalization system 200 may then use the image data to generate a personalized communication. The personalization system 200 or any of its components may be associated with the retail store 450 and be incorporated into the retail store's on-site computer system, or the personalization system 200 may be separate from the retail store's on-site computer system. The personalization system 200 may transmit the personalized communication to the retail store 450 to notify the retailer that a user is likely to visit the retail store 450. It is contemplated that the personalization system 200 may send a personalized communication to any device. For example, the personalization system 200 may send the personalized communication to any of the devices discussed above with respect to FIG. 3, for example, a user's handheld device, a device coupled to the user's vehicle, a device external to the retail store 450, or a device internal to the retail store 450. Additionally, the personalized communication discussed in the embodiments of FIG. 4 may comprise any type of personalized communications previously discussed, for example, recommendations, discounts, advertisements, orders, payment information, and so forth.

In some embodiments, the personalization system 200 may be configured to receive audio data of a vehicle from an audio capture device (not shown) and to extract identification information corresponding to the vehicle from the audio data. The audio capture device may be separate from the image capture device (e.g., a separate audio recorder) or may be incorporated into the image capture device (e.g., a video camera that records audio in addition to video). Referring back to FIG. 2, in some embodiments, an audio module 240 may be configured to receive the audio data of a vehicle from an audio capture device and to extract identification information corresponding to the vehicle from the audio data. Database interface module 220 may be configured to use the identification information to retrieve a data record 227. The personalized communication module 230 may then generate a personalized communication based on the retrieved data record 227. In some embodiments, database interface module 220 may be configured to use the identification information extracted from the audio data to retrieve a data record 227 without using identification information extracted from image data. In some embodiments, database interface module 220 may be configured to use the identification information extracted from the audio data along with identification information extracted from image data to retrieve a data record 227.

Audio data may be processed by the audio module 240 to recognize information contained in the audio data that may identify a user or vehicle. To the extent needed, the audio module 240 may perform audio recognition on the audio data to identify information captured in the audio data. It is contemplated that any audio recognition techniques may be used to identify information captured in the audio data. In some embodiments, the natural noise of a vehicle may be used to validate or confirm an identity match. For example, the personalization system 200 may use a unique engine sound signature to identify or verify the identification of a vehicle based on differences in engine sound that may exist from one car to another car. In some embodiments, an apparatus may be added to a vehicle that may broadcast a unique audio pattern, which may be used by the personalization system 200 to identify the vehicle. In some embodiments, this unique audio pattern may be broadcast in a way not detectable by the human ear.

Figure 5:
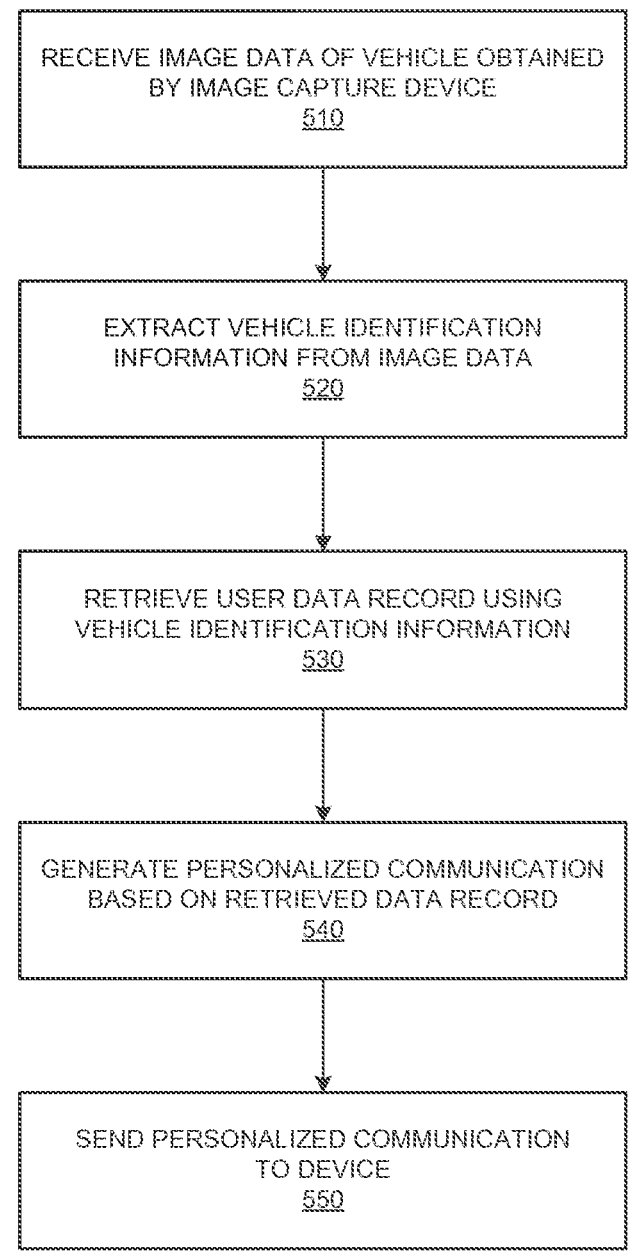
FIG. 5 is a flowchart illustrating an example embodiment of a method for user personalization.

FIG. 5 is a flowchart illustrating an example embodiment of a method 500 for user personalization. It is contemplated that any of the previously discussed features may be incorporated into the method 500.

At operation 510, a personalization system (e.g., personalization system 200) receives image data of a vehicle. The image data may have been obtained by an image capture device. In some embodiments, the image data comprise a still image or video.

At operation 520, the personalization system extracts vehicle identification information from the image data. Examples of vehicle identification information include, but are not limited to, a license plate number, a make and/or model of a vehicle, and a color of a vehicle. Other examples of vehicle identification information include, but are not limited to, one or more other distinguishing features of a vehicle, such as dents, scratches, bumper stickers, emblems, decals, and various vehicle features (e.g., sunroof, spoiler, rims or hubcaps, and exhaust pipes).

At operation 530, the personalization system retrieves a user data record using the vehicle identification information. In some embodiments, the user data record may comprise user history information or user preference information.

At operation 540, the personalization system generates a personalized communication based on the retrieved data record. The personalized communication may comprise a variety of different types of information, including, but not limited to, recommendations, offers, notifications of a user's location, an order, payment information, and a prompting of an action by a store employee to service a user.

At operation 550, the personalization system sends the personalized communication to one or more of a variety of devices, including, but not limited to, a user's handheld device (e.g., a cell phone), a device of the vehicle (e.g., display system in vehicle), a display external to a retail store or any other location or structure associated with the sale of goods and/or services (e.g., a drive-through display), and an on-site computer system located internally within the retail store or any other location or structure associated with the sale of goods and/or services (e.g., a device that is part of the on-site computer system and used by employees of the retail store).

Figure 6:
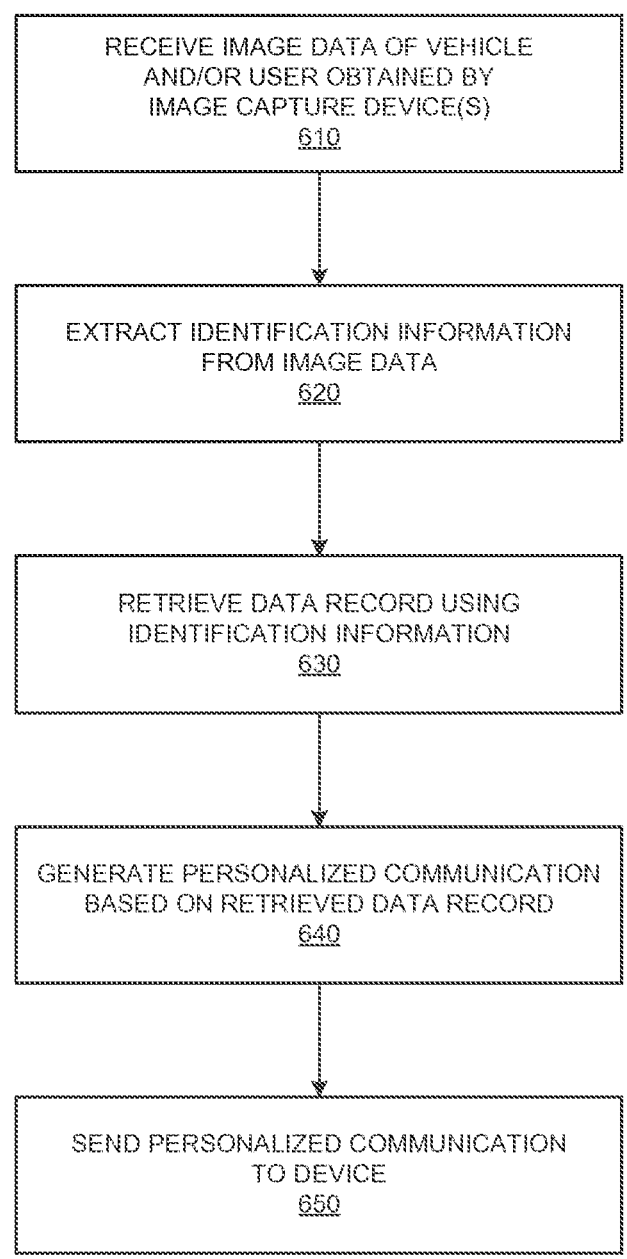
FIG. 6 is a flowchart illustrating another example embodiment of a method for user personalization.

FIG. 6 is a flowchart illustrating another example embodiment of a method 600 for user personalization. It is contemplated that any of the previously discussed features may be incorporated into the method 600.

At operation 610, a personalization system (e.g., personalization system 200) receives image data of a vehicle and/or image data of a user. The image data may have been obtained by an image capture device. In some embodiments, the image data comprise a still image or video.

At operation 620, the personalization system extracts identification information from the image data. The identification information may comprise information to identify a user and/or information to identify a vehicle. Examples of vehicle identification information include, but are not limited to, a license plate number, a make and/or model of a vehicle, and a color of a vehicle. Other examples of vehicle identification information include, but are not limited to, one or more other distinguishing features of a vehicle, such as dents, scratches, bumper stickers, emblems, decals, and various vehicle features (e.g., sunroof, spoiler, rims or hubcaps, and exhaust pipes). Examples of user identification information include, but are not limited to, an image of a user (e.g., a user's face), clothing worn by a user, and one or more identifying features of a user (e.g., tattoos, scars, piercing s, hair style, facial hair, glasses, and accessories).

At operation 630, the personalization system retrieves a data record using the identification information. In some embodiments, the data record may comprise a data record associated with a user. In some embodiments, the user data record may comprise user history information or user preference information. In some embodiments, the data record may be associated with a vehicle. In some embodiments, the vehicle data record may comprise history information or preference information associated with a vehicle.

At operation 640, the personalization system generates a personalized communication based on the retrieved data record. The personalized communication may comprise a variety of different types of information, including, but not limited to, recommendations, offers, notifications of a user's location, an order, and payment information.

At operation 650, the personalization system sends the personalized communication to one or more of a variety of devices, including, but not limited to, a user's handheld device (e.g., a cell phone), a device of the vehicle (e.g., display system in vehicle), a display external to a retail store (e.g., a drive-through display), and an on-site computer system located internally within the retail store.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
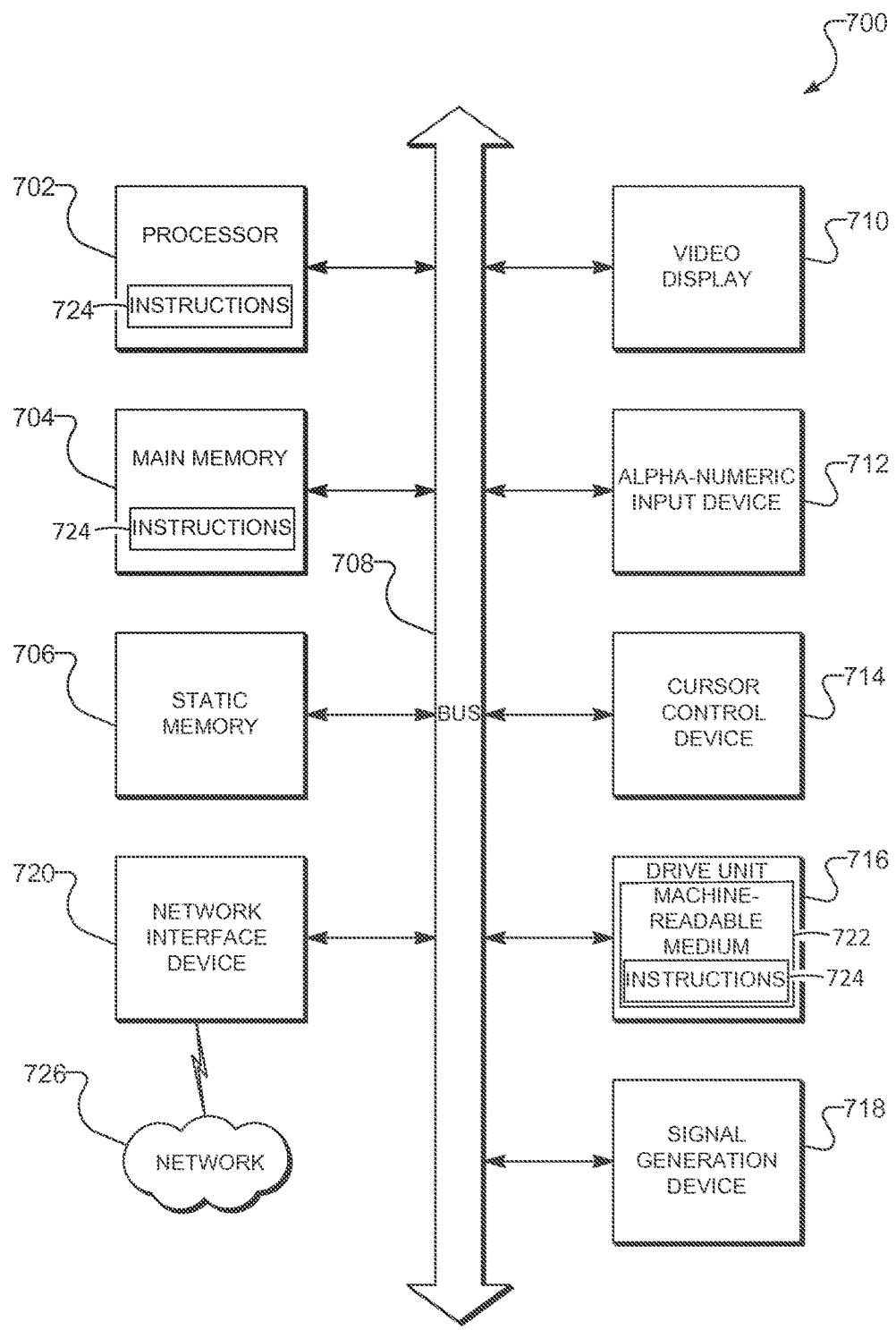
FIG. 7 shows a diagrammatic representation of a machine in the example form of a computer system within which a set of instructions may be executed to cause the machine to perform any one or more of the methodologies discussed herein.

FIG. 7 is a block diagram of a machine in the example form of a computer system 700 within which instructions 724 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving image data of a vehicle and an occupant of the vehicle from an image capture device;
   extracting vehicle identification information from the received image data for the vehicle;
   extracting occupant identification information from the received image for the occupant of the vehicle;
   retrieving a data record associated with a user using the vehicle identification information and the occupant identification information;
   generating, by at least one processor, a personalized communication, based on the retrieved data record, the personalized communication being related to goods or services associated with a place of commerce that is in an area proximate to the image capture device based on and in response to the image capture device capturing the image data and the personalized communication including one or more communications selected from a group of communications consisting of: a recommendation to purchase the goods or services, an offer to purchase the goods or services, an advertisement directed toward the goods or services, and information about the goods or services;
   determining that the user is within the place of commerce based on retrieving the data record using the vehicle identification information and the occupant identification information from the received image; and
   causing, in response to determining that the user is within the place of commerce, the personalized communication to be displayed on a display of a client device of a merchant of the goods or services in which the client device is in the area proximate to the image capture device.

2. The method of claim 1, wherein the occupant identification information includes identification information selected from a group of identification information consisting of: the occupant's face, tattoos, scars, piercings, hair style, facial hair, glasses, and accessories.

3. The method of claim 1, wherein the vehicle identification information includes identification information selected from a group of identification information consisting of: a license plate number of the vehicle, a make of the vehicle, a model of the vehicle, and a color of the vehicle.

4. The method of claim 1, wherein the image capture device is located proximate a point-of-sale device configured to complete a transaction for an item.

5. The method of claim 1, wherein the data record comprises a history of transactions for the user or preferences of the user.

6. A system comprising: non-transitory memory including instructions stored thereon; at least one processor configured to execute the instructions to cause the system perform operations comprising: receiving image data of a vehicle and an occupant of the vehicle from an image capture device; and extracting identification information from the received image data of the vehicle and the occupant of the vehicle; using the identification information to retrieve a data record associated with a user; generating a personalized communication, based on the retrieved data record, the personalized communication being related to goods or services associated with a place of commerce that is in an area proximate to the image capture device and the personalized communication including one or more communications selected from a group of communications consisting of: a recommendation to purchase the goods or services, an offer to purchase the goods or services, an advertisement directed toward the goods or services, and information about the goods or services; and causing the personalized communication to be displayed on a display of a client device of a merchant of the goods or services in which the client device is in the area proximate to the image capture device.

7. The system of claim 6, wherein the image data comprises a still image or video.

8. The system of claim 6, wherein the identification information comprises vehicle identification information.

9. The system of claim 8, wherein the identification information further comprises occupant identification information, wherein retrieving the data record is based on both the occupant identification information and the vehicle identification information.

10. The system of claim 9, wherein the occupant identification information includes identification information selected from a group of identification information consisting of: the occupant's face, tattoos, scars, piercings, hair style, facial hair, glasses, and accessories.

11. The system of claim 8, wherein the vehicle identification information includes identification information selected from a group of identification information consisting of: a license plate number of the vehicle, a make of the vehicle, a model of the vehicle, and a color of the vehicle.

12. The system of claim 6, wherein the image capture device is located proximate a point-of-sale device configured to complete a transaction for an item.

13. The system of claim 6, wherein the data record comprises a history of transactions for the user or preferences of the user.

14. A non-transitory machine-readable medium storing a set of instructions that, in response to being executed by at least one processor, causes the execution of operations comprising:

receiving image data of a vehicle and an occupant of the vehicle from an image capture device;

extracting identification information from the received image data of the vehicle and the occupant of the vehicle;

retrieving a data record associated with a user using the identification information;

generating, by at least one processor, a personalized communication, based on the retrieved data record, the personalized communication being related to goods or services associated with a place of commerce that is in an area proximate to the image capture device and the personalized communication including one or more communications selected from a group of communications consisting of: a recommendation to purchase the goods or services, an offer to purchase the goods or services, an advertisement directed toward the goods or services, and information about the goods or services; and causing the personalized communication to be displayed on a display of a client device of a merchant of the goods or services in which the client device is in the area proximate to the image capture device.

15. The non-transitory machine-readable medium of claim 14, wherein the identification information comprises vehicle identification information and occupant identification information, wherein retrieving the data record is based on both the occupant identification information and the vehicle identification information.

16. The non-transitory machine-readable medium of claim 14, wherein the identification information includes identification information selected from a group of identification information consisting of: the occupant's face, tattoos, scars, piercings, hair style, facial hair, glasses, and accessories.

* * * * *